US012560757B2

(12) United States Patent
Painchaud et al.

(10) Patent No.: US 12,560,757 B2
(45) Date of Patent: Feb. 24, 2026

(54) MANAGING EVANESCENT OPTICAL COUPLING IN PHOTONIC INTEGRATED CIRCUITS

(71) Applicant: Ciena Corporation, Hanover, MD (US)

(72) Inventors: Yves Painchaud, Quebec (CA); Marie-Josee Picard, L'Ancienne-Lorette (CA); Antoine Bois, Quebec (CA)

(73) Assignee: Ciena Corporation, Hanover, MD (US)

( * ) Notice: Subject to any disclaimer, the term of this patent is extended or adjusted under 35 U.S.C. 154(b) by 225 days.

(21) Appl. No.: 18/487,205

(22) Filed: Oct. 16, 2023

(65) Prior Publication Data

US 2025/0123441 A1      Apr. 17, 2025

(51) Int. Cl.
*G02B 6/293* (2006.01)
*G02B 6/12* (2006.01)
*G02B 6/125* (2006.01)

(52) U.S. Cl.
CPC ......... *G02B 6/12007* (2013.01); *G02B 6/125* (2013.01); *G02B 6/29331* (2013.01); *G02B 6/29332* (2013.01); *G02B 2006/12097* (2013.01)

(58) Field of Classification Search
CPC ....................... G02B 6/29331; G02B 6/29332
See application file for complete search history.

(56) References Cited

U.S. PATENT DOCUMENTS

| | | | |
|---|---|---|---|
| 8,948,549 B2 | 2/2015 | Picard et al. | |
| 12,372,719 B2 * | 7/2025 | Pelc ......................... | G02B 6/42 |
| 2015/0338577 A1 | 11/2015 | Shi et al. | |
| 2018/0231713 A1 | 8/2018 | Picard | |

FOREIGN PATENT DOCUMENTS

| | | | | |
|---|---|---|---|---|
| JP | 2015090450 A | * | 5/2015 | |
| JP | 2015152822 A | * | 8/2015 | ............. G02B 6/126 |
| JP | 2015230465 A | * | 12/2015 | |

* cited by examiner

*Primary Examiner* — Charlie Y Peng
(74) *Attorney, Agent, or Firm* — Young Basile Hanlon & MacFarlane, P.C.

(57)      ABSTRACT

A first waveguide core structure (WCS) is configured to confine an optical wave (OW) at a first wavelength to a first mode and a second wavelength to a second mode, each over a coupling region (CR). A second WCS is configured to confine an OW at the first wavelength to a third mode and the second wavelength to a fourth mode, each over the CR. The CR comprises a structure in which portions of the first and second WCS are in proximity over a coupling distance and provides a first coupling between the first and third mode, at a first location, that is greater than a second coupling between the second and fourth mode at the first location, and a third coupling between the second and fourth mode, at a second location, that is greater than a fourth coupling between the first and third mode at the second location.

16 Claims, 11 Drawing Sheets

MANAGING EVANESCENT OPTICAL COUPLING IN PHOTONIC INTEGRATED CIRCUITS

TECHNICAL FIELD

This disclosure relates to managing evanescent optical coupling in photonic integrated circuits.

BACKGROUND

In the context of integrated photonics, a tap coupler is a device that couples a fraction (typically a few percent, but possibly more) of an optical signal in a main waveguide to a tap waveguide (e.g., for monitoring the optical power within the main waveguide). For example, tap couplers may be used in real-time operation of a photonic integrated circuit (e.g., in lidar applications). Some tap couplers may utilize evanescent optical coupling to transfer optical energy from the main waveguide to the tap waveguide.

SUMMARY

In one aspect, in general, an article of manufacture comprises: a first waveguide core structure configured to confine an optical wave at a first wavelength to a first mode over a coupling region, and confine an optical wave at a second wavelength to a second mode over the coupling region; and a second waveguide core structure configured to confine an optical wave at the first wavelength to a third mode over the coupling region, and confine an optical wave at the second wavelength to a fourth mode over the coupling region; wherein the coupling region comprises a structure in which a portion of the first waveguide core structure is in proximity to a portion of the second waveguide core structure over a coupling distance and is configured to provide a first coupling between the first mode and the third mode, at a first location along the coupling distance, that is greater than a second coupling between the second mode and the fourth mode at the first location, and provide a third coupling between the second mode and the fourth mode, at a second location along the coupling distance different from the first location, that is greater than a fourth coupling between the first mode and the third mode at the second location.

Aspects can include one or more of the following features.

The first waveguide core structure comprises a semi-rib waveguide core structure comprising a guiding portion characterized by a thickness that is larger than a thickness of a non-guiding region extending from only one side of the guiding portion of the semi-rib waveguide core structure.

The second waveguide core structure comprises a rib waveguide core structure comprising a guiding portion characterized by a thickness that is larger than a thickness of non-guiding regions extending from both sides of the guiding portion of the rib waveguide core structure.

The first waveguide core structure is configured to define transverse intensity profiles of the first mode and the second mode that spatially vary along the first waveguide core structure.

The second waveguide core structure is configured to define transverse intensity profiles of the third mode and the fourth mode that spatially vary along the second waveguide core structure.

The portion of the first waveguide core structure is separated from the portion of the second waveguide core structure by less than five times a mode field diameter of a guided mode of the first or second waveguide core structure.

An edge of the portion of the first waveguide core structure is separated from an edge of the portion of the second waveguide core structure by a first distance at the first location and by a second distance larger than the first distance at the second location.

The second wavelength is larger than the first wavelength.

The first waveguide core structure is characterized by at least one of a width or a thickness that varies along the first waveguide core structure.

The second waveguide core structure is characterized by at least one of a width or a thickness that varies along the second waveguide core structure.

At least one of the width or the thickness of the first waveguide core structure is not equal to the width or the thickness of the second waveguide core structure at the first location.

The first waveguide core structure is composed of a first material and the second waveguide core structure is composed of a second material different from the first material.

The first waveguide core structure is in contact with a first cladding composed of a first material and the second waveguide core structure is in contact with a second cladding composed of a second material different from the first material.

The article of manufacture further comprises at least one stress-modifying formation located closer to the first waveguide core structure than to the second waveguide core structure, where the stress-modifying formation modifies a stress within a portion of a cladding in contact with the first waveguide core structure.

The modified stress within the portion of the cladding modifies an index of refraction associated with the cladding.

In another aspect, in general, an article of manufacture comprises: a first waveguide structure including a first guiding portion of the first waveguide structure that is located in a coupling region; a second waveguide structure including a second guiding portion of the second waveguide structure that is located in the coupling region; a first non-guiding region extending from the first guiding portion and comprising a slab structure characterized by a first thickness and a first index of refraction; and a second non-guiding region extending from the second guiding portion, wherein the second non-guiding region is characterized by one or both of a thickness smaller than the first thickness, or an index of refraction smaller than the first index of refraction.

Aspects can include one or more of the following features.

The article of manufacture further comprises a third non-guiding region extending between the first guiding portion and the second guiding portion, on an opposite side of the first guiding portion from the first non-guiding region, and on an opposite side of the second guiding portion from the second non-guiding region.

The article of manufacture further comprises one or more stress-modifying formations located closer to the first waveguide structure than to the second waveguide structure, where the stress-modifying formations modify a stress within a portion of the first cladding.

The first guiding portion is characterized by at least one of a width or a thickness that varies along the first guiding portion.

In another aspect, in general, a method comprises: forming a first waveguide core structure configured to confine an optical wave at a first wavelength to a first mode over a coupling region, and confine an optical wave at a second wavelength to a second mode over the coupling region; and forming a second waveguide core structure configured to confine an optical wave at the first wavelength to a third mode over the coupling region, and confine an optical wave at the second wavelength to a fourth mode over the coupling region; wherein the coupling region comprises a structure in which a portion of the first waveguide core structure is in proximity to a portion of the second waveguide core structure over a coupling distance and is configured to provide a first coupling between the first mode and the third mode, at a first location along the coupling distance, that is greater than a second coupling between the second mode and the fourth mode at the first location, and provide a third coupling between the second mode and the fourth mode, at a second location along the coupling distance different from the first location, that is greater than a fourth coupling between the first mode and the third mode at the second location.

Aspects can have one or more of the following advantages.

The subject matter disclosed herein includes an evanescent optical coupler (EOC), integrated on a photonic chip, that has a reduced dependency on the wavelength of one or more optical signals to be evanescently coupled between a first waveguide and a second waveguide. For example, an optical signal may include one or more optical waves, also referred to as light waves, or simply light, that may have a wavelength that falls in a range of optical wavelengths (e.g., between about 100 nm to about 1 mm, or some subrange thereof). Each optical wave may have a finite linewidth that depends on the coherence characteristics of that optical wave, and an optical signal can be comprised of any number of optical waves within any number of spectral bands of a spectrum of that optical signal. In some examples, the EOC is configured as a tap coupler such that the first waveguide is a main waveguide, the second waveguide is a tap waveguide, and the EOC transfers a fraction of an optical signal in the main waveguide to the tap waveguide. Tap couplers may be used to test various components in a photonic integrated circuit during and/or after fabrication, thereby increasing wafer yield (i.e., the percentage of viable photonic integrated circuits fabricated on a wafer) and reducing costs. Tap couplers can also be used in a photonic integrated circuit to control specific devices such as an attenuator for optimizing an overall system performance. The reduced wavelength dependency of the EOC, in some examples, results because the first and second waveguide core structures (WCSs) are of different types (e.g., a rib WCS and a semi-rib WCS), or because the first and second WCSs comprise different materials or different indices of refraction. Furthermore, the claddings surrounding the WCSs may also result in reduced wavelength dependency when they are composed of different materials or have different indices of refraction with respect to one another. In such examples, the effective indices of refraction (EIOR) of the first and second waveguides, each comprising a WCS and a cladding that may be shared between the WCSs, do not necessarily match when the two waveguides are identical in shape and size. Thus, the subject matter disclosed herein can provide enhanced EIOR-dependent coupling at different locations for different wavelengths. By allowing for different wavelengths of light to have enhanced EIOR-dependent coupling at different locations, the EOC can be designed to counteract smaller separation-dependent couplings at smaller wavelengths due to their corresponding increased modal confinement. In such examples, the EIOR-dependent coupling and the separation-dependent coupling may be designed to generate a coupling between the two waveguides that is substantially wavelength-independent over a range of wavelengths.

Other features and advantages will become apparent from the following description, and from the figures and claims.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

In integrated photonic devices (e.g., photonic integrated circuits (PICs) fabricated on a silicon photonic platform), optical signals can be guided by waveguides that comprise a waveguide core structure (WCS) composed of a core material having an index of refraction that is higher than an index of refraction of the materials surrounding the core.

Figure 1A:
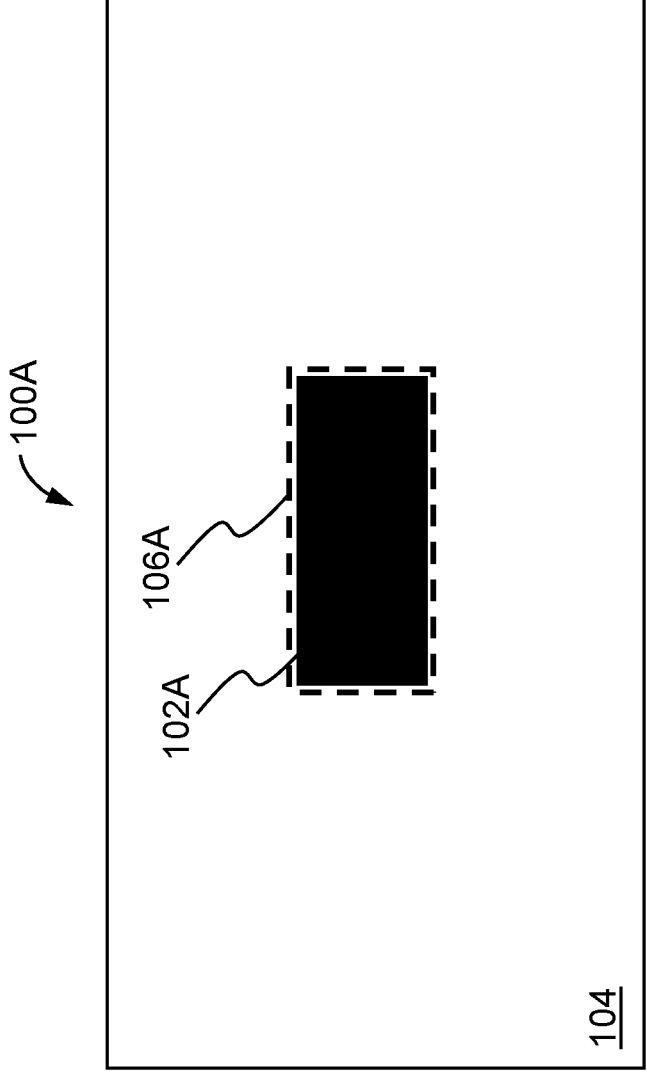
FIG. 1A is a schematic diagram of a cross-sectional view of a portion of an example PIC.

FIG. 1A shows a cross-sectional view of a portion of an example PIC 100A comprising a strip WCS 102A (e.g., silicon), also referred to as a buried channel waveguide, embedded within a cladding 104 (e.g., silicon dioxide). The majority of electromagnetic energy associated with one or more modes of light guided by the strip WCS 102A and the cladding 104 are confined within a guiding portion 106A.

Figure 1B:
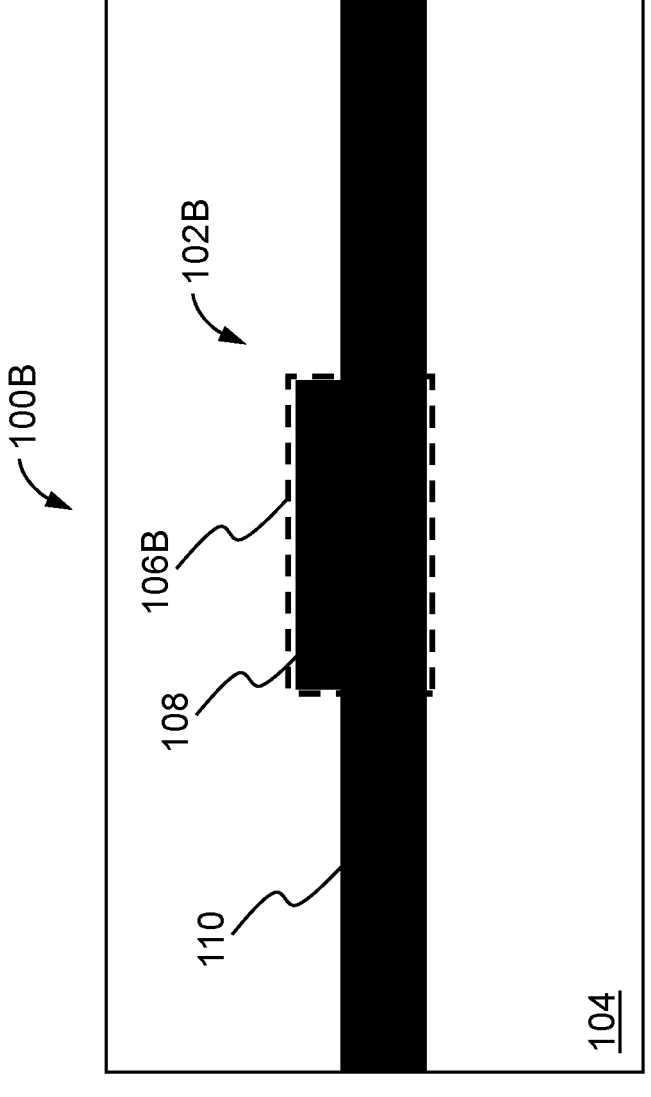
FIG. 1B is a schematic diagram of a cross-sectional view of a portion of an example PIC.

FIG. 1B shows a cross-sectional view of a portion of an example PIC 100B comprising a rib WCS 102B (e.g., silicon) embedded within a cladding 104 (e.g., silicon dioxide). The majority of electromagnetic energy associated with one or more modes of light guided by the rib WCS 102B and the cladding 104 are confined within a guiding portion 106B. The rib WCS 102B comprises a raised portion 108 formed on top of a slab 110, and is characterized by a thickness that is larger than a thickness of non-guiding regions (e.g., regions outside of the guiding portion 106B) where the rib WCS 102B includes the slab 110 but does not include the raised portion 108. In some examples, the raised portion 108 and the slab 110 are composed of the same material (e.g., silicon). In such examples, the raised portion 108 may be formed from the slab 110 by etching portions of the slab 110.

An evanescent optical coupler (EOC), which may be integrated within a PIC (or other article of manufacture), comprises a first waveguide and a second waveguide in proximity to one another such that one or more optical signals can be evanescently coupled between the two wave- guides. In some examples, an EOC may be configured as a tap coupler with a tap ratio equal to the fraction of light (e.g., 10%) that is evanescently coupled from a main waveguide to a tap waveguide (e.g., to monitor light from the main waveguide by coupling a fraction of its light into the tap waveguide that is further optically coupled to a photodiode). In some applications of EOCs, it can be desirable to deter- mine the fraction of the light that is coupled between the first waveguide and the second waveguide (e.g., in the case of a tap coupler, so as to be able to determine the amount of light in the main waveguide). In general, the tap ratio of a tap coupler can depend on the wavelength of the light within the tap coupler.

Figure 2A:
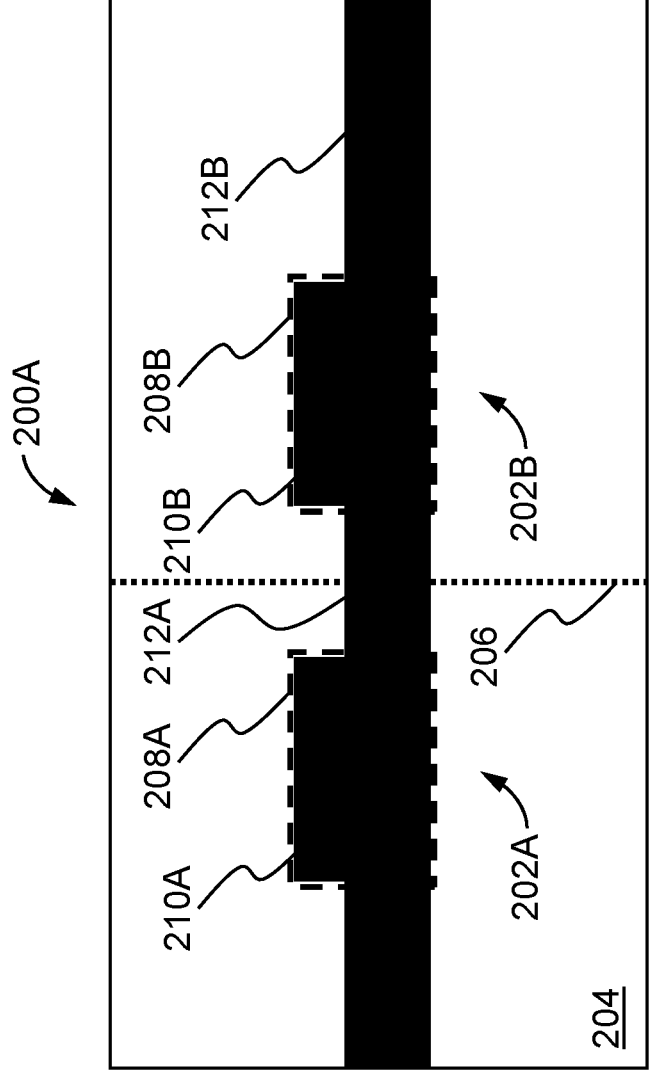
FIG. 2A is a schematic diagram of a cross-sectional view of an example EOC.

FIG. 2A shows a cross-sectional view of an example EOC 200A comprising a first rib WCS 202A and a second rib WCS 202B, each composed of the same material (e.g., silicon), embedded within a cladding 204 (e.g., silicon dioxide), and on opposite sides of a plane extending into the page and denoted by a dotted line 206. The majority of electromagnetic energy associated with one or more modes of light propagating within the first rib WCS 202A is confined within a first guiding portion 208A. The majority of electromagnetic energy associated with one or more modes of light propagating within the second rib WCS 202B is confined within a second guiding portion 208B. Within the first guiding portion 208A, the first rib WCS 202A com- prises a first raised portion 210A formed on top of a first slab 212A. Within the second guiding portion 208B, the second rib WCS 202B comprises a second raised portion 210B formed on top of a second slab 212B. In this example, the first raised portion 210A, the second raised portion 210B, the first slab 212A, and the second slab 212B are composed of the same material (e.g., silicon).

Figure 2B:
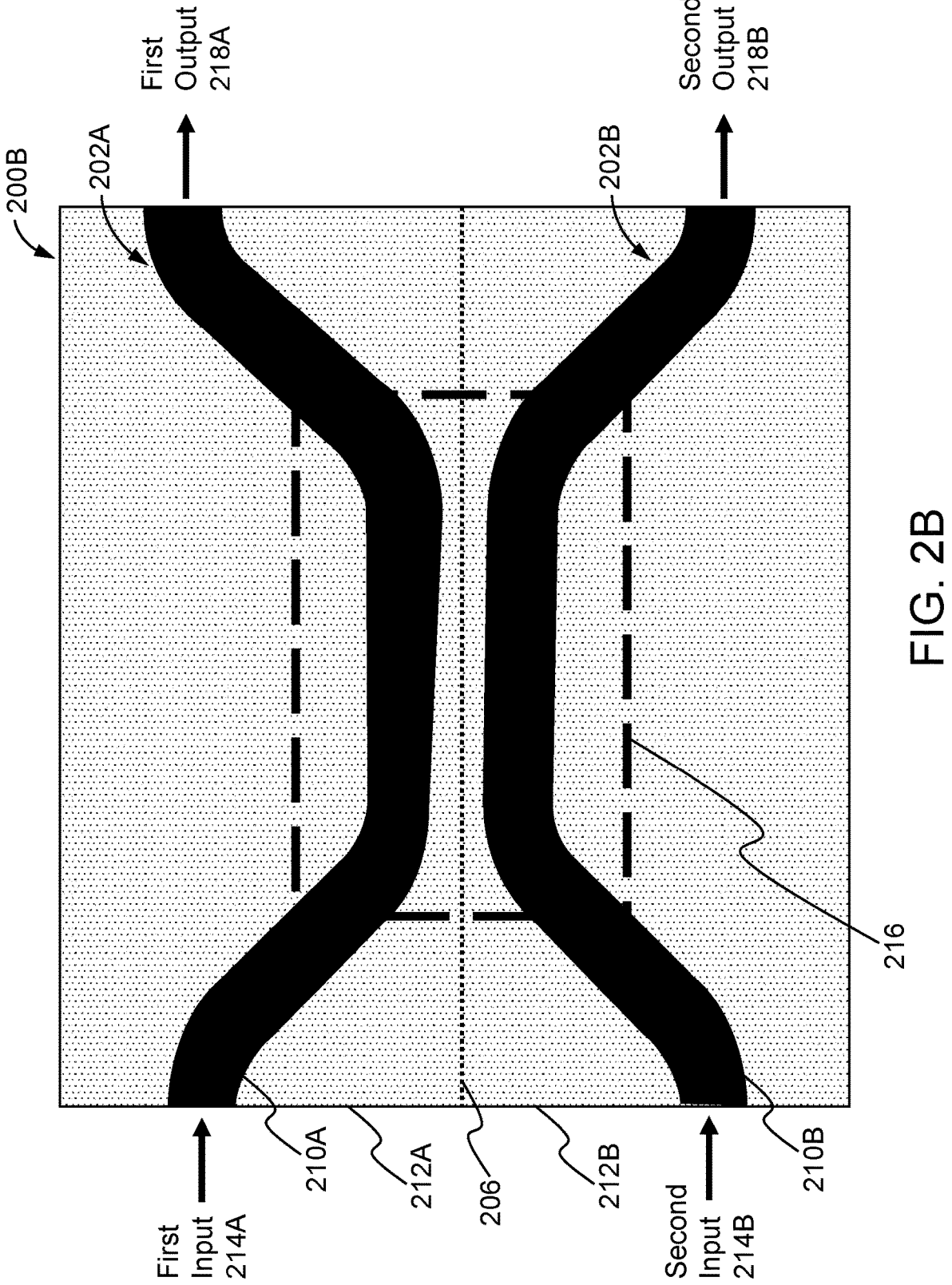
FIG. 2B is a schematic diagram of an example EOC, as viewed from above.

FIG. 2B shows an example EOC 200B, as viewed from above. A first optical signal may enter the EOC 200B at a first input 214A of a first rib WCS 202A and a second optical signal may enter the EOC 200B at a second input 214B of a second rib WCS 202B. The first rib WCS 202A and the second rib WCS 202B are on opposite sides of a plane extending into the page and denoted by a dotted line 206, and are evanescently coupled to each other over a coupling region 216. In some examples, such as when the EOC 200B is configured as a tap coupler, the first rib WCS 202A is configured to receive a fraction of light, via evanescent coupling, from the second rib WCS 202B. In such examples, the first rib WCS 202A receives a portion of light provided at the second input 214B over the coupling region 216 and transmits the light to other portions of the PIC, such as a photodiode (not shown), via a first output 218A. In such examples, the first input 214A may not receive any light as input while a second output 218B may receive and provide as an output the second optical signal that was provided at the second input 214B, less any light coupled to the first rib WCS 202A and any losses (e.g., light radiated into unguided portions of the PIC). The first rib WCS 202A comprises a first raised portion 210A formed on top of a first slab 212A and the second rib WCS 202B comprises a second raised portion 210B formed on top of a second slab 212B. In general, a portion of the light guided by the first rib WCS 202A and a portion of the light guided by the second rib WCS 202B may propagate within the first slab 212A and the second slab 212B, respectively. The coupling between the first rib WCS 202A and the second rib WCS 202B can depend on the width, length, and shape of: the first top portion 210A, the second top portion 210B, the first slab 212A, and the second slab 212B, as well as the separation between the first rib WCS 202A and the second rib WCS 202B. In this example, the width of the first top portion 210A and the separation between the first rib WCS 202A and the second WCS 202B vary longitudinally (i.e., along the propagation axis of the EOC 200B, which overlaps with the dotted line 206).

In some examples, an EOC can be configured as a tap coupler that taps (i.e., couples from a main WCS into a tap WCS) a fraction of an optical signal characterized by a wavelength that lies within a range of wavelengths. In telecommunication applications, for example, the range of wavelengths can be within the C-band (i.e., between about 1525 nm and about 1570 nm). In many applications (e.g., for a tap coupler configuration), it is desired that the coupling within an EOC does not depend (or weakly depends) on the wavelength of the optical signal over a range of wave- lengths. Designing such reduced wavelength dependence EOCS (RWD EOCs) can be challenging because the con- finement of an optical mode within a waveguide often depends on the wavelength of the optical mode. Compared to longer wavelengths, light at shorter wavelengths is more strongly confined within a waveguide and, as a result, coupling to another nearby waveguide is reduced since the modal overlap between the two waveguides is reduced. Compared to shorter wavelengths, light at longer wave- lengths is less strongly confined within a waveguide and, as a result, coupling to another nearby waveguide is increased since the modal overlap between the two waveguides is increased.

In general, an optical mode propagating within a wave- guide can have a portion of its energy confined within a WCS (e.g., characterized by a material of higher refractive index), and a portion of its energy confined within a cladding (e.g., characterized by a material with a lower refractive index). Thus, the optical mode propagates with an effective index of refraction (EIOR) that determines the variation of the phase of the optical mode as a function of time and position along the waveguide. The EIOR has a value that is between the indices of refraction of the core and of the cladding.

Referring again to FIGS. 2A and 2B, phase matching occurs when the first rib WCS 202A and the second rib WCS 202B are characterized by respective EIOR that are equal. Such phase matching results in a maximum coupling between the first rib WCS 202A and the second rib WCS 202B, and may occur in a region where the two waveguides are in close proximity, or over a portion of a region char- acterized by close proximity (e.g., the coupling region 216 of FIG. 2B). In this example, the first rib WCS 202A has a width that spatially varies, thereby resulting in an EIOR that spatially varies. When the first rib WCS 202A and the second rib WCS 202B are of the same type (e.g., both are strip WCSs or both are rib WCSs), the same materials (e.g., silicon), and are surrounded by claddings that have the same indices of refraction and structure, phase matching occurs when the two WCSs are identical (i.e., having the same height and width), regardless of the wavelength of the light within the two WCSs. In such examples, the coupling at the one or more locations where phase matching occurs is stronger for longer wavelengths and weaker for shorter wavelengths, since the longer wavelength optical mode is less confined, thereby resulting in a greater modal overlap between the respective optical modes of the two WCSs.

Referring again to FIGS. 2A and 2B, in some examples, the respective EIOR of the first rib WCS 202A and of the second rib WCS 202B may never fulfill the phase matching condition along the EOC 200A or the EOC 200B. In general, optical coupling between the first rib WCS 202A and of the second rib WCS 202B may occur through quasi-phase matching, where the respective EIOR are not equal, rather than phase matching, where the respective EIOR are equal. In cases where phase matching does not occur along the EOC, the largest EIOR-dependent coupling can occur at one or more locations that are the closest to phase matching conditions.

Figure 3:
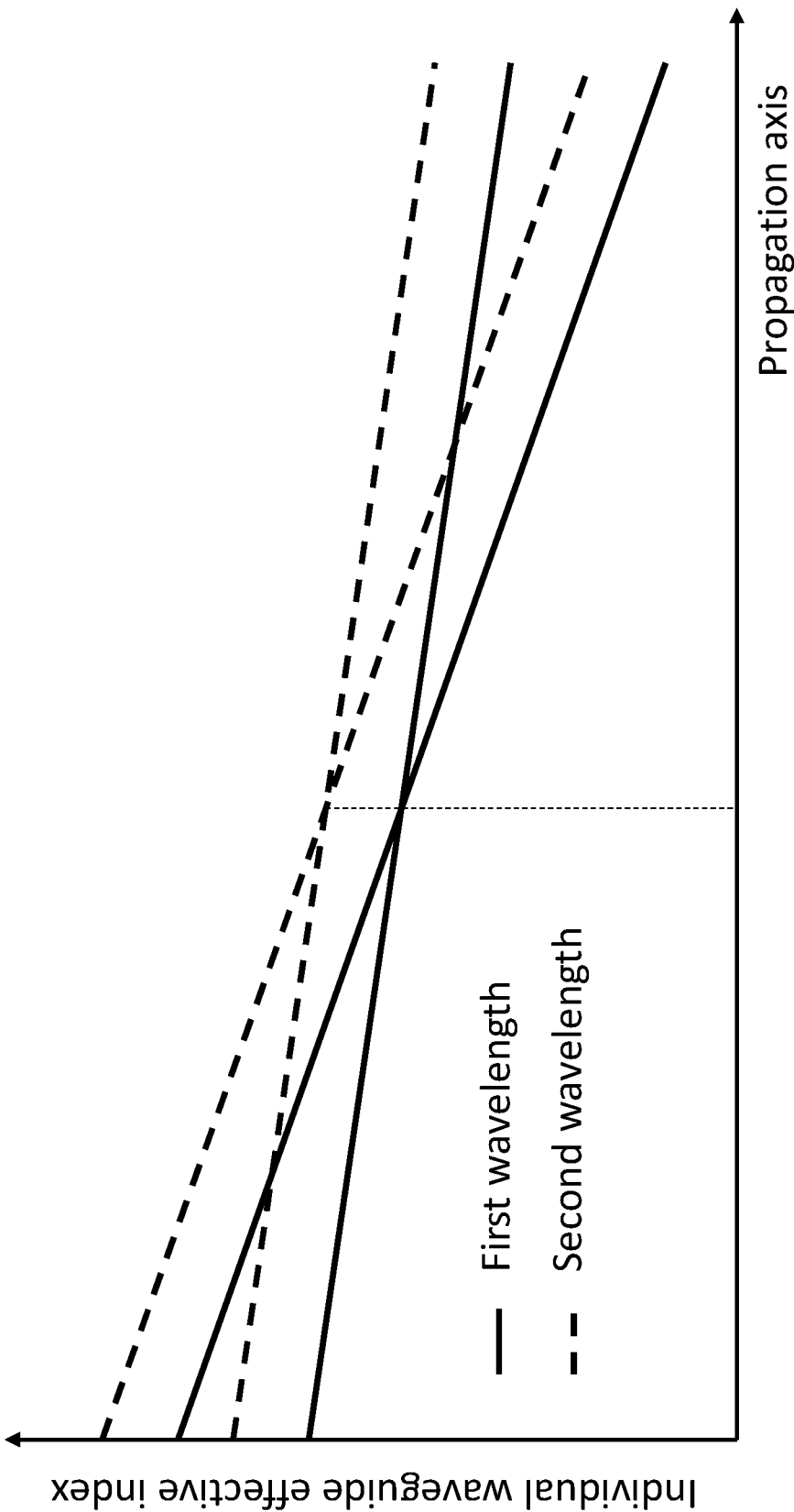
FIG. 3 is a prophetic plot of two example EIOR for two different wavelengths, as a function of distance along the propagation axis of an EOC comprising two waveguides.

FIG. 3 shows a prophetic plot of two example EIOR for two different wavelengths, as a function of distance along the propagation axis of an EOC comprising two waveguides. Although the respective EIOR of the two waveguides both vary as a function of distance along the propagation axis (e.g., the two waveguides have varying widths), the point along the propagation axis at which the respective EIOR are equal (denoted by a vertical dashed line), where the EIOR of each waveguide cross and result in phase matching (i.e., maximal EIOR-dependent coupling), is the same point for the two different wavelengths. The separation-dependent coupling at the phase matching point, however, will be smaller for whichever wavelength is shorter, thus leading to a possibly undesirable wavelength-dependent coupling associated with the product of the EIOR-dependent coupling and the separation-dependent coupling.

However, if two WCSs of an EOC are of a different type (e.g., a rib WCS and a strip WCS) and/or of different materials (e.g., one WCS comprises silicon and the other WCS comprises silicon nitride), the one or more points of phase matching can be different for different wavelengths of light within the two waveguides. For example, in the case of an EOC comprising a strip WCS and a rib WCS in close proximity (e.g., within five times the mode field diameter of a guided mode of either of the waveguides), a first phase matching or a first enhanced quasi-phase matching can occur at a first position for a shorter wavelength of light and a second phase matching or a second enhanced quasi-phase matching can occur at a second position for a longer wavelength of light. In such examples, the EOC may be designed such that the strip WCS and the rib WCS are in closer proximity to one another (i.e., have stronger modal overlap and therefore stronger separation-dependent coupling) at the first position so as to counteract the increased modal confinement of the shorter wavelength light that would otherwise result in weaker separation-dependent coupling at the first position.

In some examples, it may be challenging to fabricate an EOC comprising a strip WCS and a rib WCS in close proximity, since a rib WCS includes a slab and a strip WCS do not include a slab. Thus, in some examples, an EOC may comprise a rib WCS and a semi-rib WCS, as shown in FIG. 4A.

FIGS. 4A, 4B, 4C, 4D, and 4E show example EOCs that allow for phase matching to occur when the respective raised portions of two waveguides are different (e.g., having different heights and/or widths, or different surrounding structures), in contrast to the EOCs shown in FIGS. 2A and 2B.

Figure 4A:
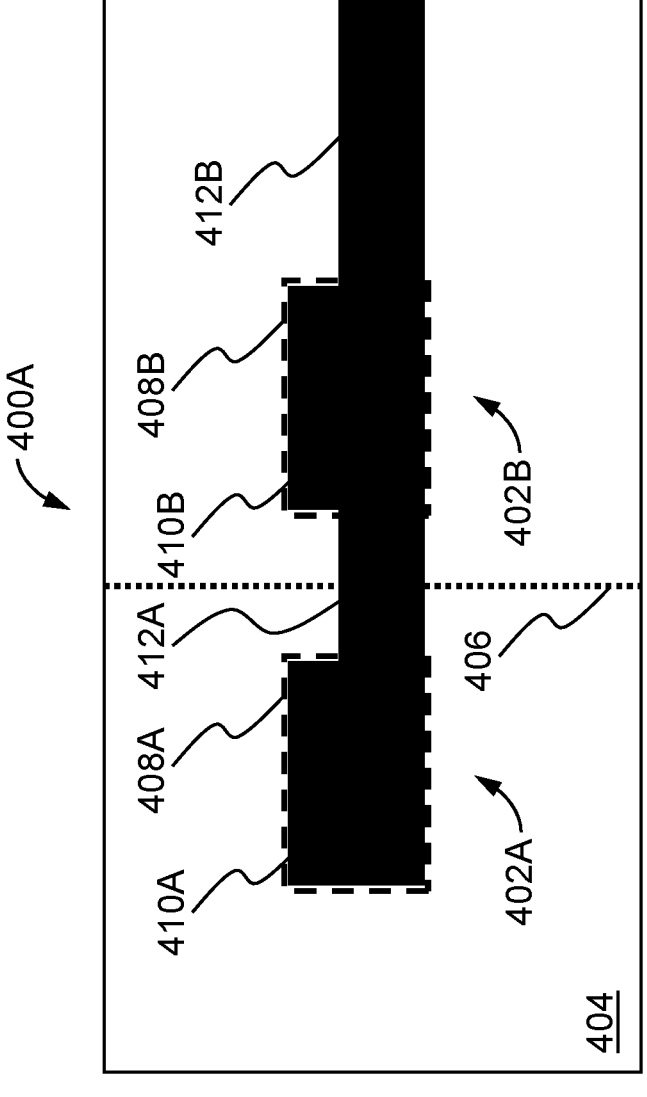
FIG. 4A is a schematic diagram of a cross-sectional view of an example EOC.

FIG. 4A shows a cross-sectional view of an example EOC 400A comprising a semi-rib WCS 402A and a rib WCS 402B, each composed of the same material (e.g., silicon), embedded within a cladding 404 (e.g., silicon dioxide), and on opposite sides of a plane extending into the page and denoted by a dotted line 406. The majority of electromagnetic energy associated with one or more modes of light propagating within the semi-rib WCS 402A is confined within a first guiding portion 408A. The majority of electromagnetic energy associated with one or more modes of light propagating within the rib WCS 402B is confined within a second guiding portion 408B. Within the first guiding portion 408A, the semi-rib WCS 402A comprises a first raised portion 410A formed on top of a first slab 412A. Within the second guiding portion 408B, the rib WCS 402B comprises a second raised portion 410B formed on top of a second slab 412B.

Referring again to FIG. 4A, a first non-guiding region (not shown) extends to the right of the second guiding portion 408B and comprises the second slab 412B characterized by a first thickness and a first index of refraction. A second non-guiding region (not shown) extends to the left side of the first guiding portion 408A and is characterized by a thickness smaller than the first thickness. In this example, there is no slab extending from the left side of the first guiding portion 408A. In other examples, a slab may extend from the left side of the first guiding portion 408A and be characterized by a thickness smaller than the first thickness or by an index of refraction smaller than the first index of refraction. A third non-guiding region (not shown) extends between the first guiding portion 408A and the second guiding portion 408B, on an opposite side of the first guiding portion 408A from the first non-guiding region, and on an opposite side of the second guiding portion 408B from the second non-guiding region. The first guiding portion 408A is characterized by a thickness that is larger than a thickness of a non-guiding region (e.g., where the semi-rib WCS 402A does not include the first raised portion 410A) extending from only one side (the right side) of the first guiding portion 408A of the semi-rib WCS 402A. The second guiding portion 408B is characterized by a thickness that is larger than a thickness of non-guiding regions (e.g., where the rib WCS 402B does not include the second raised portion 410B) extending from both sides of the second guiding portion 408B of the rib WCS 402B. In some examples, the first raised portion 410A, the second raised portion 410B, the first slab 412A, and the second slab 412B are composed of the same material (e.g., silicon). In other examples, the first raised portion 410A, the second raised portion 410B, the first slab 412A, and the second slab 412B are composed of different materials (e.g., silicon and doped silicon). In some examples, the first raised portion 410A and the second raised portion 410B are formed from the first slab 412A and the second slab 412B by etching.

Referring again to FIG. 4A, because the two WCSs are of different types (a semi-rib WCS and a rib WCS), phase matching (i.e., identical EIOR) does not necessarily occur when the first raised portion 410A and the second raised portion 410B are identical (i.e., having the same height and width), as would be the case if the two WCSs were of the same types (e.g., two rib WCSs). Instead, phase matching may occur when the height and/or widths of the first raised portion 410A and the second raised portion 410B are different. Furthermore, phase matching may be wavelength-dependent, such that phase matching occurs at a first position for a shorter wavelength and occurs at a second position for a longer wavelength. Since the phase matching can occur between non-identical WCSs in such examples, the separation between the two WCSs can be designed to be smaller for the shorter wavelength phase matching and larger for the longer wavelength phase matching, thus counteracting the increased modal confinement of the shorter wavelength light that would otherwise result in weaker separation-dependent coupling. Although a shorter wavelength and a longer wavelength are used to help guide the intuition behind such designs, in general the design can be compatible with and incorporate a possibly wide range of wavelengths. Additionally, the points of phase matching may instead be regions of phase matching or of quasi-phase matching that result in an EIOR-dependent coupling that also depends on wavelength. Thus, for a range of wavelengths the EIOR-dependent coupling can be engineered with consideration of the separation-dependent coupling, both of which can depend on the wavelength.

Referring again to FIG. 4A, the coupling for a given wavelength can depend at least in part on the product of the EIOR-dependent coupling and the separation-dependent coupling, each of which can depend on the wavelength. In EOCs configured as tap couplers, the EIOR-dependent coupling and the separation-dependent coupling can be designed so as to result in a range of wavelengths that have the same or similar tap ratios (i.e., the fraction of the optical signal that is transmitted from a main waveguide to a tap waveguide). In some examples, the first slab 412A may also extend past the left side of the first guiding portion 410A and may be tapered or have a different thickness than the first slab 412A on the right side of the first guiding portion 410A. Such examples may allow for additional design control over the coupling and the tap ratio for a range of wavelengths.

Figure 4B:
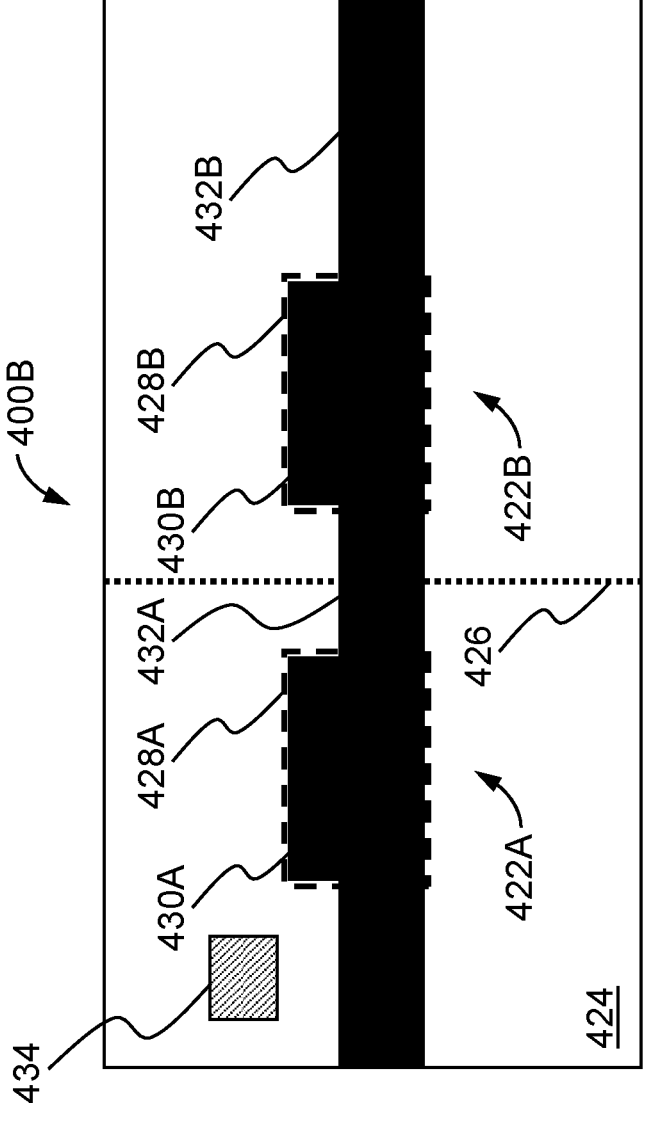
FIG. 4B is a schematic diagram of a cross-sectional view of an example EOC.

FIG. 4B shows a cross-sectional view of an example EOC 400B comprising a first rib WCS 422A and a second rib WCS 422B, each composed of the same material (e.g., silicon), embedded within a cladding 424 (e.g., silicon dioxide), and on opposite sides of a plane extending into the page and denoted by a dotted line 426. The majority of electromagnetic energy associated with one or more modes of light propagating within the first rib WCS 422A is confined within a first guiding portion 428A. The majority of electromagnetic energy associated with one or more modes of light propagating within the second rib WCS 422B is confined within a second guiding portion 428B. Within the first guiding portion 428A, the first rib WCS 422A comprises a first raised portion 430A formed on top of a first slab 432A. Within the second guiding portion 428B, the second rib WCS 422B comprises a second raised portion 430B formed on top of a second slab 432B. A stress-modifying formation 434 is located closer to the first top portion 430A than to the second top portion 430B, resulting in a change in the EIOR of the first rib WCS 422A relative to examples where the stress-modifying formation 434 is absent. As described above, the stress-modifying formation modifies a stress within a portion of a cladding in contact with the WCS, and the modified stress within the portion of the cladding modifies an index of refraction associated with the cladding. In this example, the two waveguide cores are the same type (two rib WCSs), but the stress-modifying formation 434 allows for phase matching to occur when the first raised portion 430A and the second raised portion 430B are different (i.e., having different heights and/or widths). In such examples, the separation between the two WCSs can be designed to be smaller for a shorter wavelength phase matching and larger for a longer wavelength phase matching, thus counteracting the increased modal confinement of the shorter wavelength light that would otherwise result in weaker separation-dependent coupling.

Figure 4C:
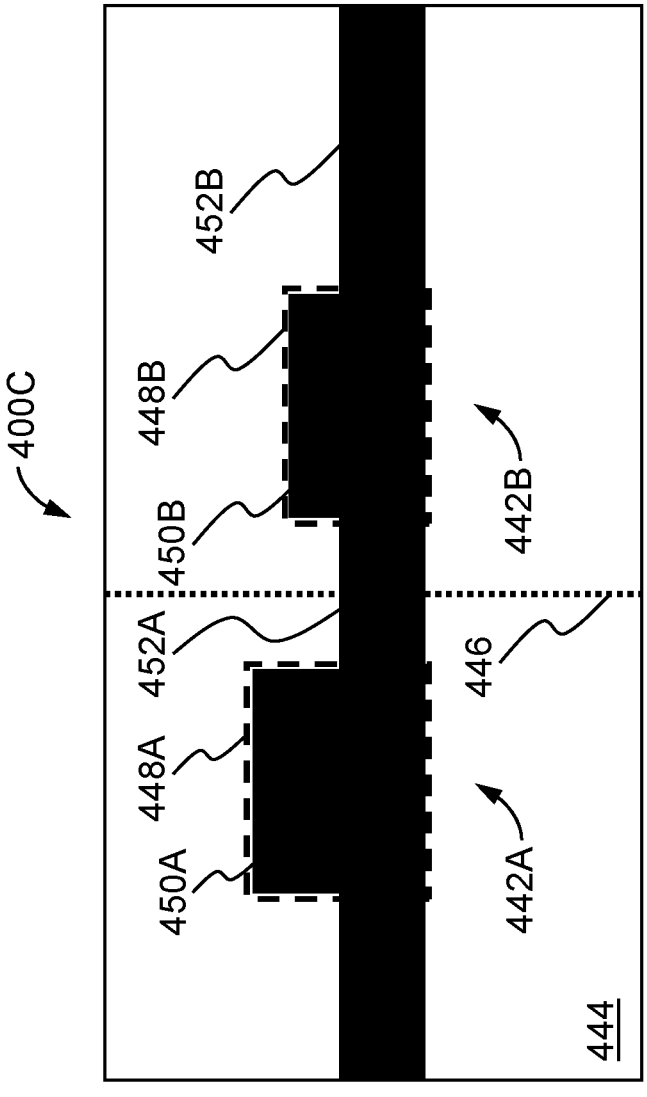
FIG. 4C is a schematic diagram of a cross-sectional view of an example EOC.

FIG. 4C shows a cross-sectional view of an example EOC 400C comprising a first rib WCS 442A and a second rib WCS 442B, each composed of the same material (e.g., silicon), embedded within a cladding 444 (e.g., silicon dioxide), and on opposite sides of a plane extending into the page and denoted by a dotted line 446. The majority of electromagnetic energy associated with one or more modes of light propagating within the first rib WCS 442A is confined within a first guiding portion 448A. The majority of electromagnetic energy associated with one or more modes of light propagating within the second rib WCS 442B is confined within a second guiding portion 448B. Within the first guiding portion 448A, the first rib WCS 442A comprises a first raised portion 450A formed on top of a first slab 452A. Within the second guiding portion 448B, the second rib WCS 442B comprises a second raised portion 450B formed on top of a second slab 452B. In this example, the two waveguide cores are the same type (two rib WCSs), but the difference in thickness between the first raised portion 450A and the second raised portion 450B allows for phase matching to be wavelength dependent (e.g., to occur at two different points along the propagation axis of the EOC 400C for two different wavelengths) and to occur when the first raised portion 450A and the second raised portion 450B have different widths. In such examples, the separation between the two WCSs can be designed to be smaller for a shorter wavelength phase matching and larger for a longer wavelength phase matching, thus counteracting the increased modal confinement of the shorter wavelength light that would otherwise result in weaker separation-dependent coupling. In some examples, the thickness or width of the first raised portion 450A, or the thickness or width of the second raised portion 450B, can vary along the propagation axis to provide additional parameters over which the coupling can be controlled (e.g., to reduce the wavelength dependence of the EOC 400C).

Figure 4D:
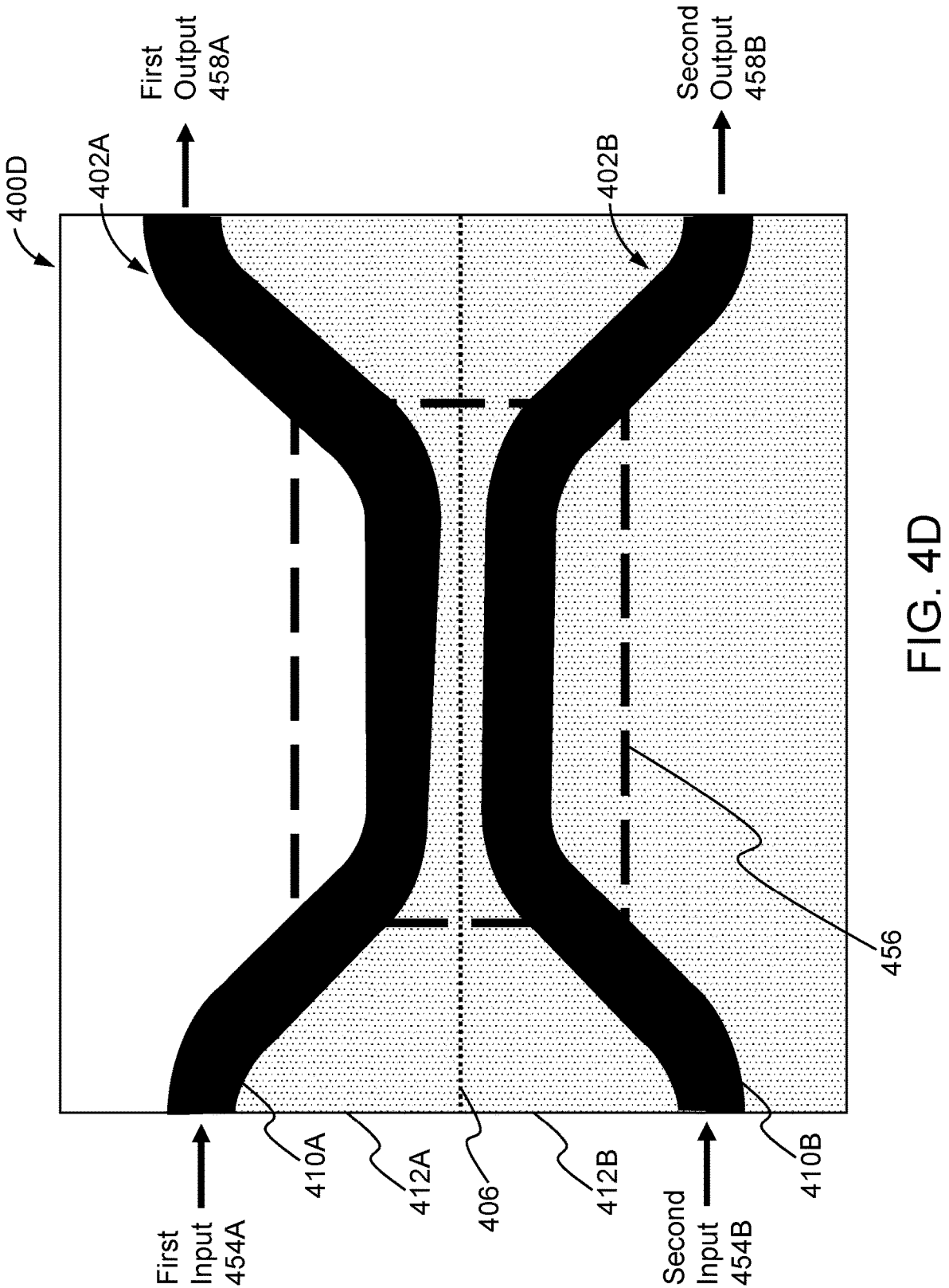
FIG. 4D is a schematic diagram of an example EOC, as viewed from above.

FIG. 4D shows a top view of an example EOC 400D with a similar configuration as the EOC 400B of FIG. 4B. A first optical signal may enter the EOC 400D at a first input 454A of a semi-rib WCS 402A and a second optical signal may enter the EOC 400D at a second input 454B of a rib WCS 402B. The semi-rib WCS 402A and the rib WCS 402B are on opposite sides of a plane extending into the page and denoted by a dotted line 406, and are evanescently coupled to each other over a coupling region 456. In some examples, such as when the EOC 400D is configured as a tap coupler, the semi-rib WCS 402A is configured to receive a fraction of light, via evanescent coupling, from the rib WCS 402B. In such examples, the semi-rib WCS 402A receives a portion of light provided at the second input 454B over the coupling region 456 and transmits the light to other portions of the PIC, such as a photodiode (not shown), via a first output 458A. In such examples, the first input 454A may not receive any light as input while a second output 458B may receive and provide as an output the second optical signal that was provided at the second input 454B, less any light coupled to the semi-rib WCS 402A and any losses (e.g., light radiated into unguided portions of the PIC). In some examples, the semi-rib WCS 402A receives a portion of the second optical signal provided at the second input 454B and transmits it to other portions of the photonic integrate circuit (e.g., a photodiode (not shown)) via a first output 458A. In such examples, a second output 458B may receive and provide as an output the remaining portion of the second optical signal, less any loss, to other portions of the photonic integrated circuit. A first top portion 410A has a varying width that increases from left to right along the propagation axis of the EOC 400D, which overlaps with the dotted line 406. This results in an EIOR that spatially varies, and a corresponding transverse intensity profile of a guided mode (e.g., characterized by a mode field diameter, which is a maximum diameter of the guided mode defined by locations where the transverse intensity profile is lower than the peak intensity of the guided mode by $1/e^2$) that spatially varies along the semi-rib WCS 402A.

Figure 4E:
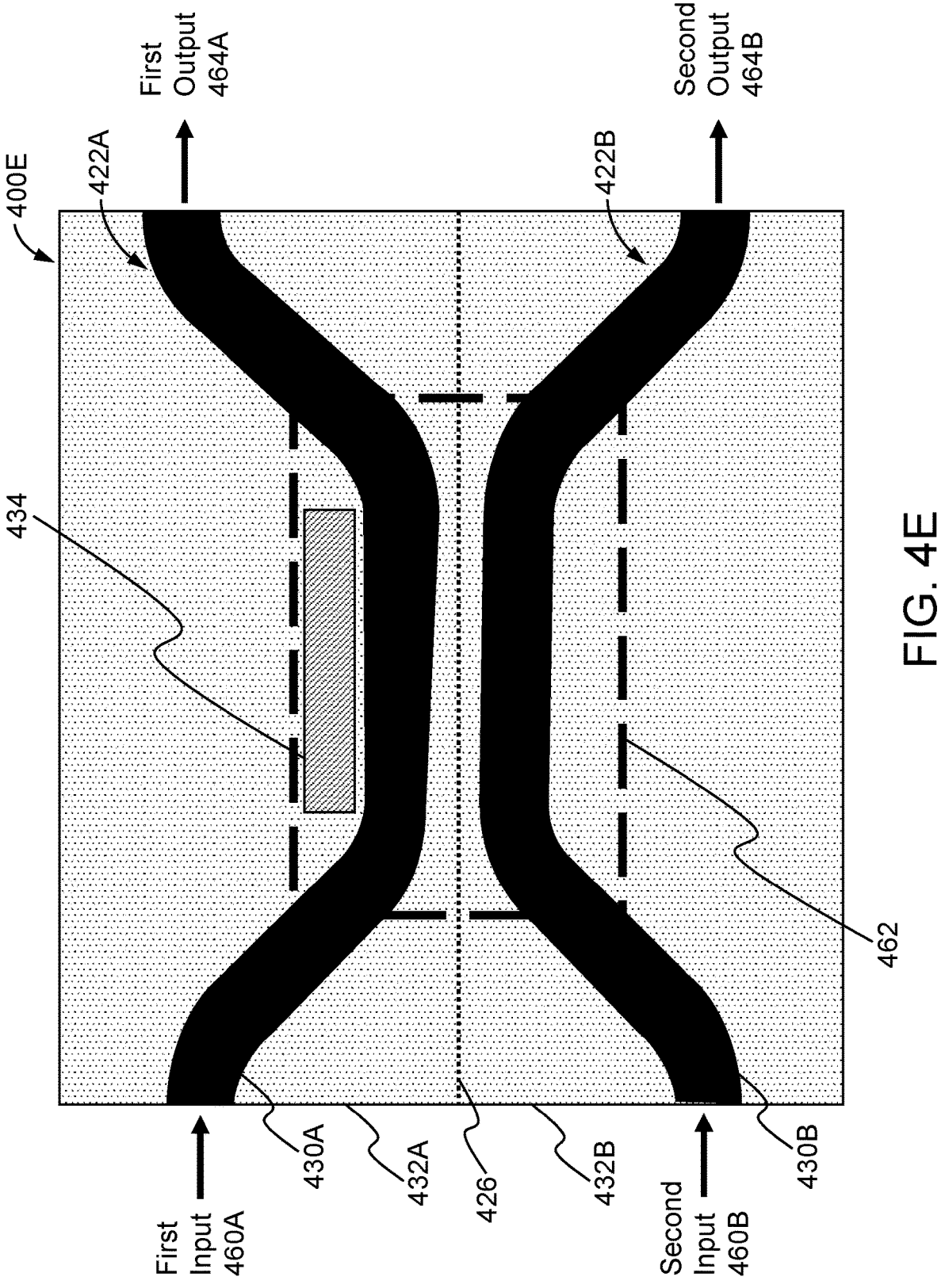
FIG. 4E is a schematic diagram of an example EOC, as viewed from above.

FIG. 4E shows a top view of an example EOC 400E with a similar configuration as the EOC 400B of FIG. 4B. A first optical signal may enter the EOC 400E at a first input 460A of a first rib WCS 422A and a second optical signal may enter the EOC 400E at a second input 460B of a second rib WCS 422B. The first rib WCS 422A and the second rib WCS 422B are on opposite sides of a plane extending into the page and denoted by a dotted line 426, and are evanescently coupled to each other over a coupling region 462. In some examples, such as when the EOC 400E is configured as a tap coupler, the first rib WCS 422A is configured to receive a fraction of light, via evanescent coupling, from the second rib WCS 422B. In such examples, the first rib WCS 422A receives a portion of light provided at the second input 460B over the coupling region 462 and transmits the light to other portions of the PIC, such as a photodiode (not shown), via a first output 464A. In such examples, the first input 460A may not receive any light as input while a second output 464B may receive and provide as an output the second optical signal that was provided at the second input 460B, less any light coupled to the first rib WCS 422A and any losses (e.g., light radiated into unguided portions of the PIC). A first top portion 430A has a varying width that increases from left to right along the propagation axis of the EOC 400E, which overlaps with the dotted line 426. A stress-modifying formation 434 is located in proximity to the first top portion 430A.

Figure 5:
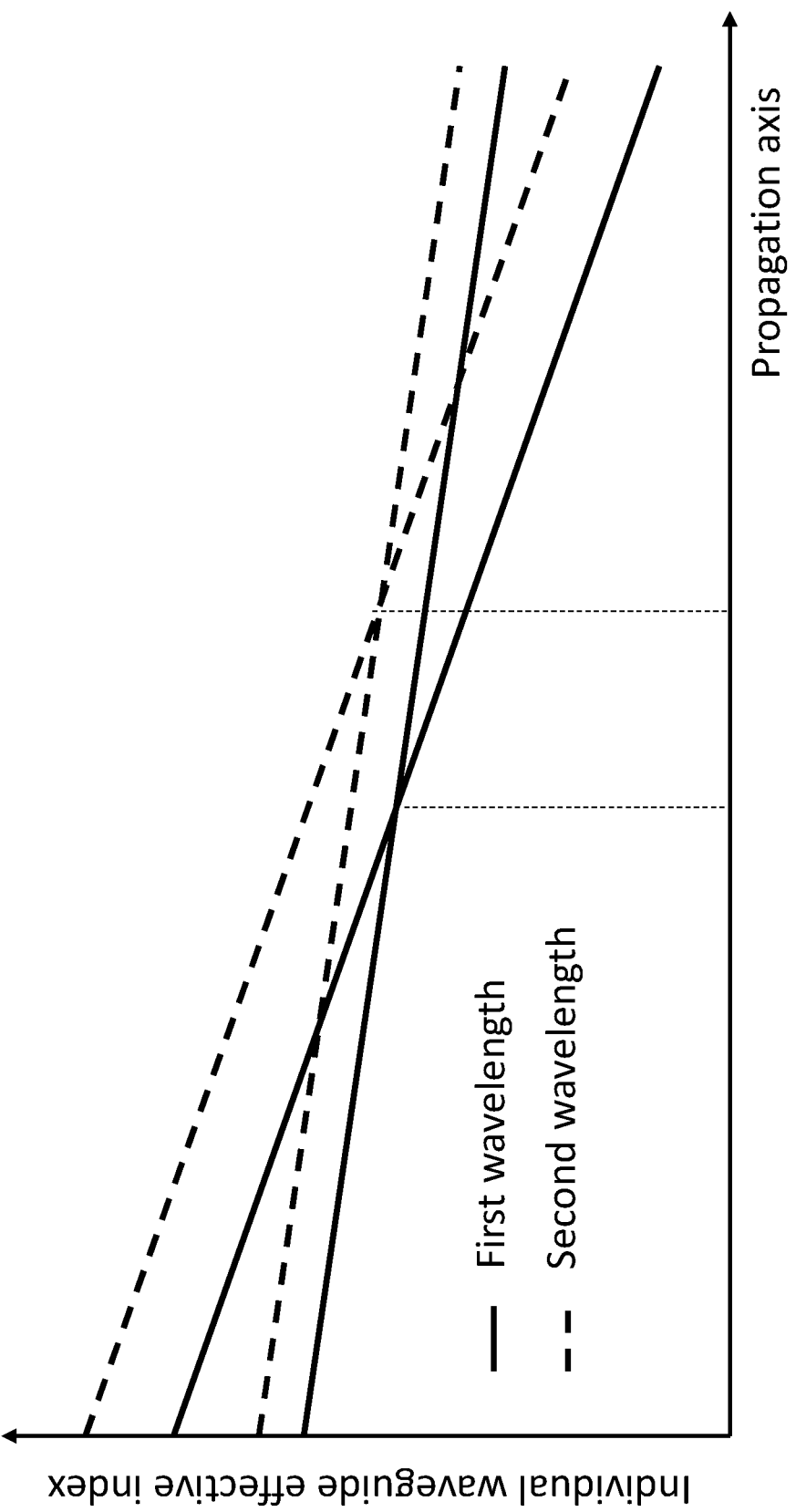
FIG. 5 is a prophetic plot of two example EIOR for two different wavelengths, as a function of distance along the propagation axis of an EOC comprising two waveguides.

FIG. 5 shows a prophetic plot of two example EIOR for two different wavelengths, as a function of distance along the propagation axis of an EOC comprising two waveguides. The EIOR of the two waveguides both vary as a function of distance along the propagation axis (e.g., the two waveguides have varying widths). In this example, the two points along the propagation axis at which the EIOR are equal (denoted by two vertical dashed lines) and result in phase matching (i.e., maximal EIOR-dependent coupling) are different points for the two different wavelengths. The two different points of maximal EIOR-dependent coupling can be used in conjunction with varying separation-dependent coupling, that also depends on wavelength, to design tap couplers with tap ratios that have a reduced wavelength dependence.

In some examples, RWD EOCs may also be designed to achieve low excess loss and to increase the robustness of the RWD EOCs with respect to fabrication bias. Excess loss refers to the loss of optical power that occurs between the two input ports and the two output ports of the EOC. Typically, excess loss may be engineered to be as low as possible given other constraints. The amount of excess loss may be reduced when the geometry of the EOC (e.g., of the two waveguides) varies slowly along the propagation axis of the EOC (e.g., a slowly increasing or decreasing taper rather than large, step-like changes).

Robustness with respect to fabrication bias refers to the goal of designing an EOC that is tolerant to bias that may occur during fabrication. For example, a typical design variation that can occur during fabrication is a bias on the WCS widths while the center-to-center separation between two WCSs remains the same or varies substantially less than the WCS width variation. Another example of a typical design variation is the thicknesses of the slab and/or the top portion of a rib WCS or semi-rib WCS that is located on top of the slab. In some examples, the variation in the WCS widths may be mitigated by selecting WCS widths in the vicinity of 450 nm (e.g., for guiding light that resides in the C-Band, with wavelengths between 1530-1565 nm) and a top portion thickness of 220 nm or thereabouts. Such a width may be associated with maximal confinement of the optical mode, such that variations around this WCS width result in smaller changes in the mode size. Since the separation-dependent coupling of an EOC may be largely a function of the mode size, such designs can thereby reduce variations in the coupling between the two waveguides (e.g., providing a less variable tap-ratio of a tap coupler).

In tap couplers comprising a rib WCS and semi-rib WCS, for example, the wavelength dependence of tap ratios can be reduced in conjunction with low excess loss and a high robustness to fabrication bias. Such designs may be achieved by engineering parameters associated with the geometry of the tap coupler (e.g., WCS widths, edge-to-edge proximities, and respective variations thereof along the propagation axis of the tap coupler), for example by utilizing simulations to select such parameters for the desired tap ratio and other properties.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. An article of manufacture comprising:
a first waveguide core structure configured to
confine an optical wave at a first wavelength to a first mode over a coupling region, and
confine an optical wave at a second wavelength to a second mode over the coupling region; and
a second waveguide core structure configured to
confine an optical wave at the first wavelength to a third mode over the coupling region, and
confine an optical wave at the second wavelength to a fourth mode over the coupling region;
wherein the coupling region comprises a structure in which a portion of the first waveguide core structure is in proximity to a portion of the second waveguide core structure over a coupling distance and is configured to
provide a first coupling between the first mode and the third mode, at a first location along the coupling distance, that is greater than a second coupling between the second mode and the fourth mode at the first location, and
provide a third coupling between the second mode and the fourth mode, at a second location along the coupling distance different from the first location, that is greater than a fourth coupling between the first mode and the third mode at the second location.

2. The article of manufacture of claim 1, wherein the first waveguide core structure comprises a semi-rib waveguide core structure comprising a guiding portion characterized by a thickness that is larger than a thickness of a non-guiding region extending from only one side of the guiding portion of the semi-rib waveguide core structure.

3. The article of manufacture of claim 2, wherein the second waveguide core structure comprises a rib waveguide core structure comprising a guiding portion characterized by a thickness that is larger than a thickness of non-guiding regions extending from both sides of the guiding portion of the rib waveguide core structure.

4. The article of manufacture of claim 1, wherein the first waveguide core structure is configured to define transverse intensity profiles of the first mode and the second mode that spatially vary along the first waveguide core structure.

5. The article of manufacture of claim 4, wherein the second waveguide core structure is configured to define transverse intensity profiles of the third mode and the fourth mode that spatially vary along the second waveguide core structure.

6. The article of manufacture of claim 1, wherein the portion of the first waveguide core structure is separated from the portion of the second waveguide core structure by less than five times a mode field diameter of a guided mode of the first or second waveguide core structure.

7. The article of manufacture of claim 1, wherein an edge of the portion of the first waveguide core structure is separated from an edge of the portion of the second waveguide core structure by a first distance at the first location and by a second distance larger than the first distance at the second location.

8. The article of manufacture of claim 7, wherein the second wavelength is larger than the first wavelength.

9. The article of manufacture of claim 1, wherein the first waveguide core structure is characterized by at least one of a width or a thickness that varies along the first waveguide core structure.

10. The article of manufacture of claim 9, wherein the second waveguide core structure is characterized by at least one of a width or a thickness that varies along the second waveguide core structure.

11. The article of manufacture of claim 1, wherein at least one of a width or a thickness of the first waveguide core structure is not equal to a width or a thickness of the second waveguide core structure, respectively, at the first location.

12. The article of manufacture of claim 1, wherein the first waveguide core structure is composed of a first material and the second waveguide core structure is composed of a second material different from the first material.

13. The article of manufacture of claim 1, wherein the first waveguide core structure is in contact with a first cladding composed of a first material and the second waveguide core structure is in contact with a second cladding composed of a second material different from the first material.

14. The article of manufacture of claim 1, further comprising at least one stress-modifying formation located closer to the first waveguide core structure than to the second waveguide core structure, where the stress-modifying formation modifies a stress within a portion of a cladding in contact with the first waveguide core structure.

15. The article of manufacture of claim 14, where the modified stress within the portion of the cladding modifies an index of refraction associated with the cladding.

16. A method comprising:
forming a first waveguide core structure configured to
confine an optical wave at a first wavelength to a first mode over a coupling region, and
confine an optical wave at a second wavelength to a second mode over the coupling region; and
forming a second waveguide core structure configured to
confine an optical wave at the first wavelength to a third mode over the coupling region, and
confine an optical wave at the second wavelength to a fourth mode over the coupling region;
wherein the coupling region comprises a structure in which a portion of the first waveguide core structure is in proximity to a portion of the second waveguide core structure over a coupling distance and is configured to
provide a first coupling between the first mode and the third mode, at a first location along the coupling distance, that is greater than a second coupling between the second mode and the fourth mode at the first location, and
provide a third coupling between the second mode and the fourth mode, at a second location along the coupling distance different from the first location, that is greater than a fourth coupling between the first mode and the third mode at the second location.

* * * * *